United States Patent [19]

Bruseker

[11] Patent Number: 5,397,041
[45] Date of Patent: Mar. 14, 1995

[54] PORTABLE CAMERA SUPPORT STAND

[76] Inventor: Theodore J. G. M. Bruseker, 14223-122 Street, Edmonton, Alberta, Canada, T5X 3R8

[21] Appl. No.: 4,746

[22] Filed: Jan. 14, 1993

[51] Int. Cl.⁶ ............................................... A45F 3/10
[52] U.S. Cl. ..................... 224/265; 224/708; 224/185; 224/201
[58] Field of Search ............... 224/908, 909, 185, 201, 224/265, 266, 270, 271, 272; 354/81, 82, 293; 352/243

[56] References Cited

U.S. PATENT DOCUMENTS

| | | | |
|---|---|---|---|
| 2,603,134 | 7/1952 | Burnam | 224/908 X |
| 3,767,095 | 10/1973 | Jones | 224/908 X |
| 4,542,966 | 9/1985 | Knaudt | 354/82 |
| 5,038,160 | 8/1991 | Schumacher et al. | 354/82 |
| 5,098,182 | 3/1992 | Brown | 224/908 X |

*Primary Examiner*—Henry J. Recla
*Assistant Examiner*—David J. Walczak

[57] ABSTRACT

A portable folding camera support stand adapted for carrying on the shoulder of a photographer is provided. The stand comprises three rectangular bars. Two of the bars are hinged onto the end of the bar which rests on the shoulder. A strap interconnects all three bars to ensure the correct angularity of the bars with respect to one another.

1 Claim, 1 Drawing Sheet

PORTABLE CAMERA SUPPORT STAND

FIELD OF THE INVENTION

The present invention relates to a portable, folding, camera support stand adapted for carrying on the shoulder of a photographer.

BACKGROUND OF THE INVENTION

Up to the present time either tripods or monopods have been utilized to support cameras. Tripods have the advantage of having great rigidity, whereas monopods offer increased manoeuvrability. Whilst these devices are very effective, they have the disadvantages of being large and cumbersome. Alternative types of support stands available are ones in which a very small monopod or tripod are used to brace the camera against the chest of the operator. Deleteriously, these units are somewhat bulky even when folded and do not allow momentary hands free operation.

Exemplary support stands are shown in U.S. Pat. No. 4,943,820 issued to W. D. Larock, U.S. Pat. No. 4,437,753 issued to R. E. Dunn and Offenlegungschrift DE 3833613 A1, the inventor being F. J. Fuhse.

It can be seen, therefore, that there exists a need for a simpler, less bulky and lighter camera support stand.

SUMMARY OF THE INVENTION

In accordance with the present invention, there is provided a folding, adjustable camera support stand adapted for carrying on the shoulder of a photographer.

More specifically, the support stand comprises an elongate, generally rectangular bar having means for supporting a camera thereon. Such means could comprise a slot having a screw extending upwardly therethrough, said screw being adapted to engage the camera base. The provision of the slot enables the camera to be adjustably moved along the bar. The rectangular bar rests upon the photographer' shoulder.

A second bar is hinged to the front of the first bar and is braced against the photographer's chest. Similarly a short bar is hinged to the rear end of the shoulder bar. A strap extends through lateral slots provided in the three bars whereby adjustment of the configuration of the bars relative to one another may be made. When the stand is not in use, the second and third bars may be folded inwardly until flush with the shoulder bar for easy storage thereof.

As a result of this invention, a lighter, folding, simpler to assemble camera support stand has been provided. Furthermore, hands-free operation is obtained.

DESCRIPTION OF THE PREFERRED EMBODIMENT

Figure 1:
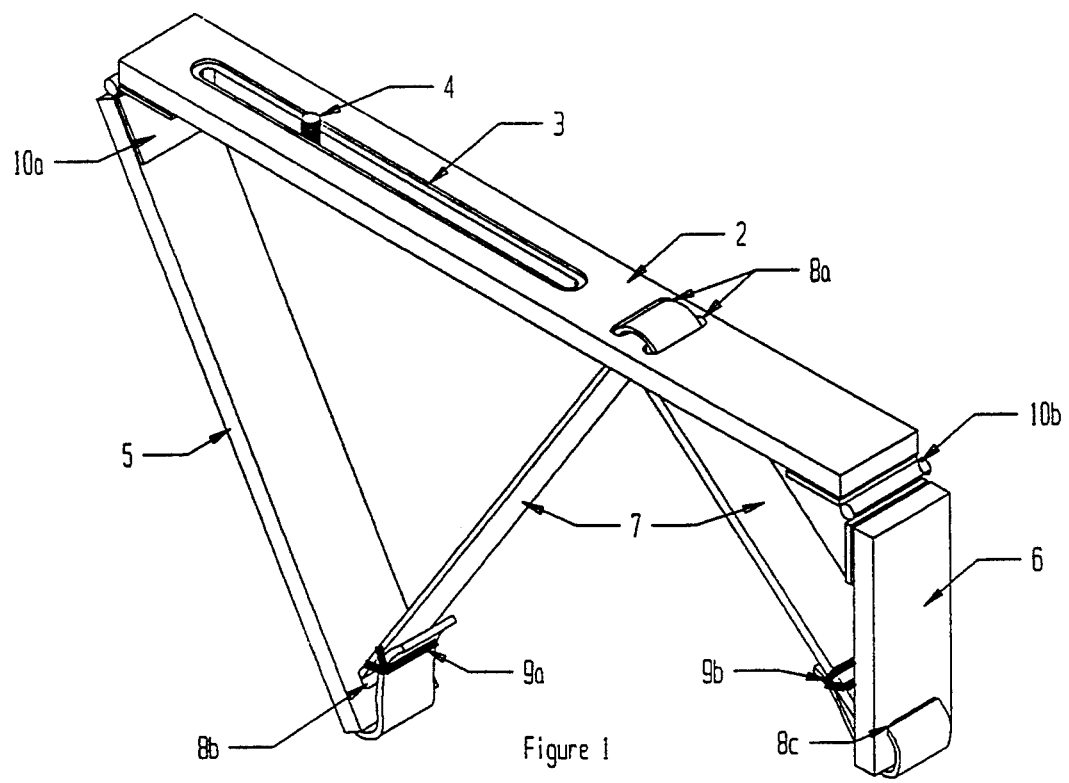
FIG. 1 is a perspective view of the camera support stand forming the instant patent disclosure.

Having reference to the accompanying drawings, there is shown, the camera support stand FIG. 1. The stand FIG. 1 comprises an elongate rectangular bar 2 which rests on the photographer's shoulder. An elongate longitudinal slot 3 is provided at the front of bar 2. The slot 3 receives a screw 4 which is slidably mounted therein. The screw 4 threadedly engages the camera's tripod socket.

A second rectangular bar 5 is hingedly attached 10a to the front of bar 2, extending downwardly therefrom. This second bar 5 rests upon the photographer's chest to thereby support the camera at the front.

At the rear of bar 2 and extending downwardly therefrom, there is hingedly attached (10b) a third bar 6. The bar 6 rests against the photographer's back forming a hook to prevent bar 2 from slipping off the shoulder.

A flexible strap 7 extends through slots 8a, 8b and 8c formed in bars 2, 5 and 6 respectively. To allow for adjustment of the positioning of the bars, buckles 9a and 9b are provided.

Figure 2:
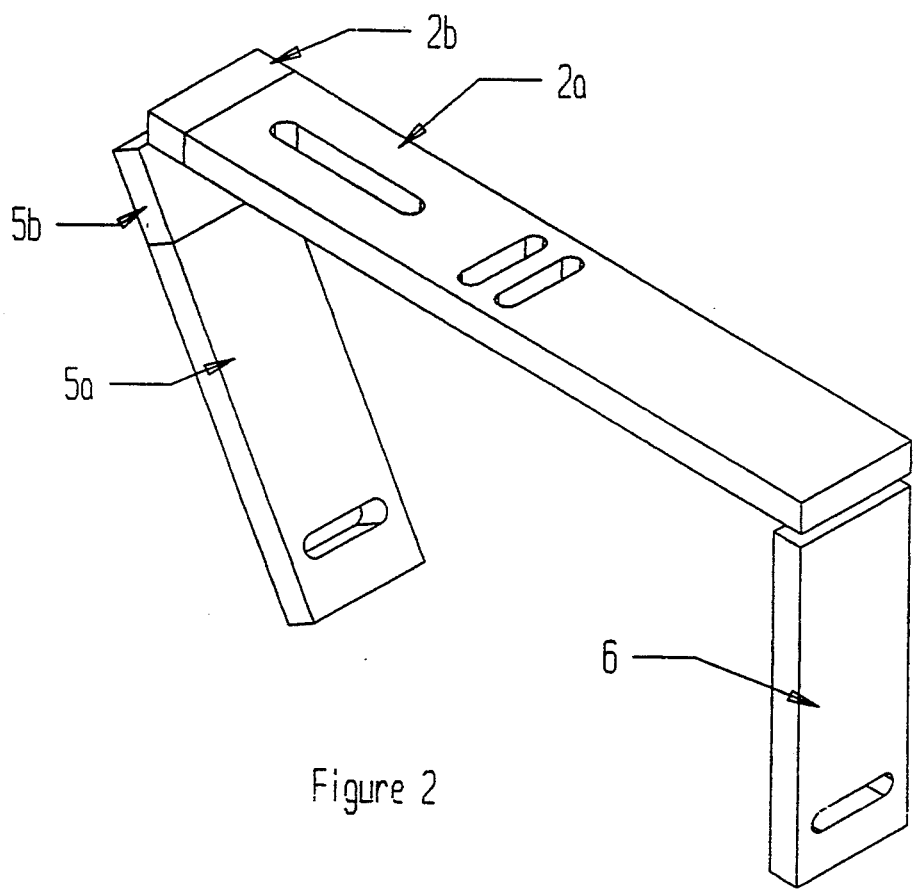
FIG. 2 is an alternative embodiment of the stand of FIG. 1.

As illustrated in FIG. 2 there is provided an alternative embodiment of the invention wherein the rectangular bar 2 and the rectangular bar 5 are split into two pieces 2a & 2b and 5a & 5b respectivly, allowing them to be functional to telescope into itself thereby making the support stand still smaller for storage purposes.

The embodiments in which an exclusive property or privilege are claimed are defined by the claims which now follow:

1. A camera support stand adapted to be worn over a shoulder of a user comprising:
    a first elongated support means adapted to overlie a shoulder of a user and having first and second ends;
    at least two slots in said first elongate support means;
    a fastener attached to said first elongate support means and adapted fasten a camera to said first elongate support means;
    a second elongated support means adapted to be positioned adjacent a chest of a user and having first and second ends wherein said first end of said second elongate support means is hingedly connected to said first end of said first elongated support means and said second end of said second elongated support means includes a slot therein;
    a third elongate support means adapted to be positioned adjacent a back of a user and having first and second ends wherein said first end of said third elongated support means is hingedly connected to said second end of said first elongated support means and said second end of said third elongated support means includes a slot therein; and
    a strap having first and second ends and an intermediate portion whereby said first strap end is adjustably attached to said slot in said second elongated support means via a buckle, said intermediate portion is threaded through said slots in said first elongated support means and said strap second end is adjustably attached to said slot in said third elongated support means via a buckle.

* * * * *